No. 694,608. Patented Mar. 4, 1902.
W. J. BREWER.
ANTIFRICTION BEARING.
(Application filed Aug. 27, 1900. Renewed Aug. 8, 1901.)
(No Model.) 2 Sheets—Sheet 1.
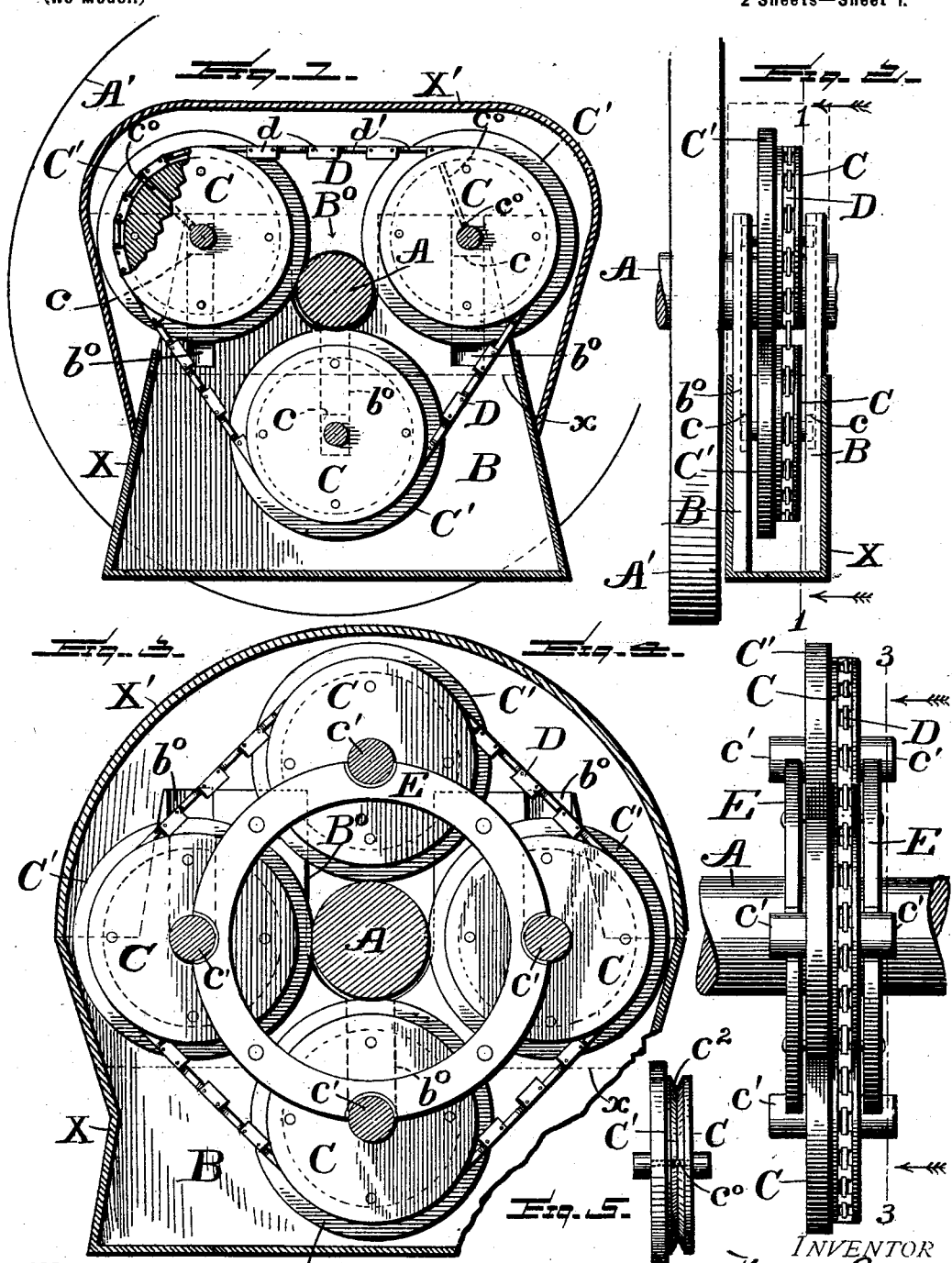
WITNESSES:
INVENTOR
BY
Attorneys

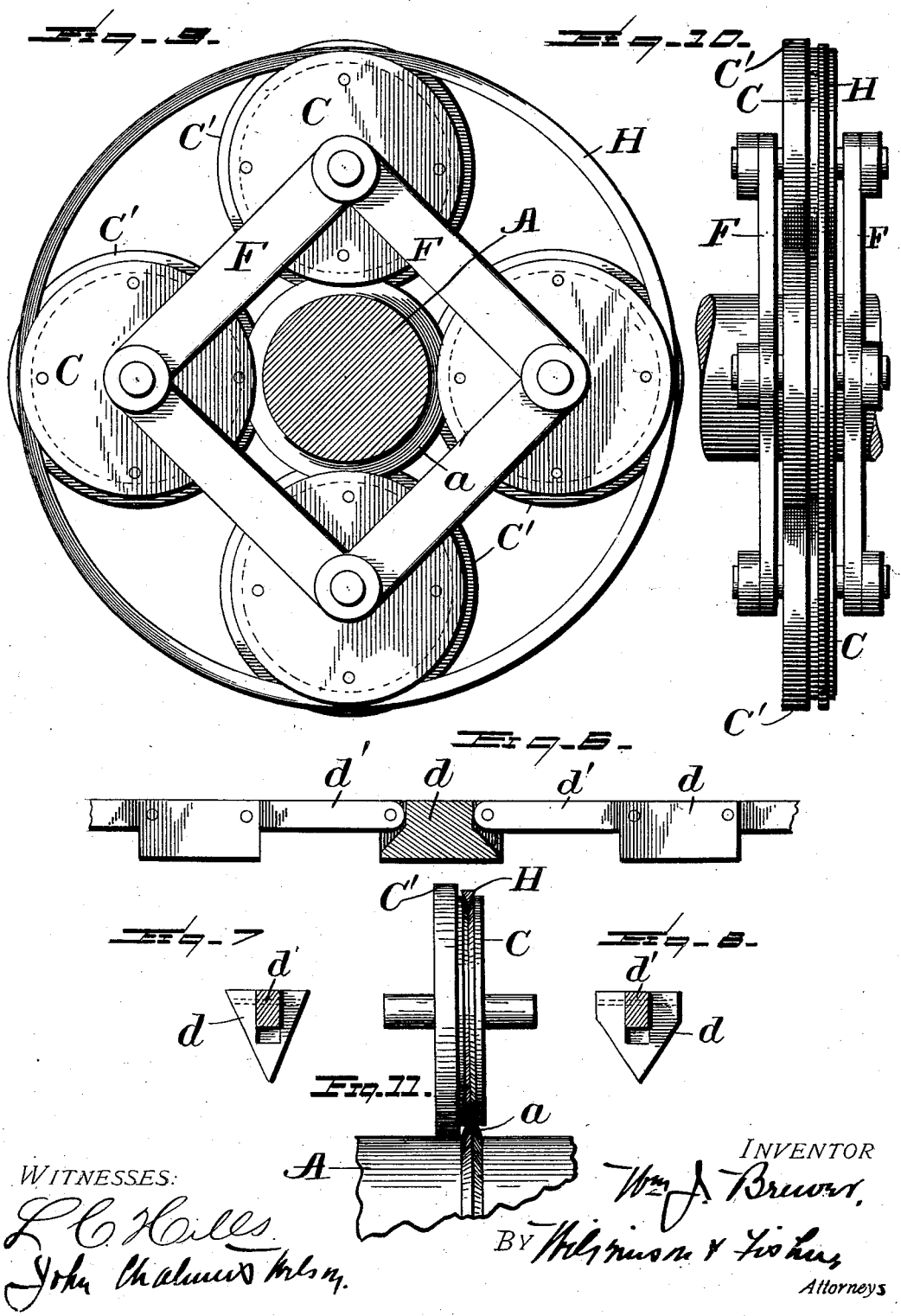

UNITED STATES PATENT OFFICE.

WILLIAM J. BREWER, OF WASHINGTON, DISTRICT OF COLUMBIA, ASSIGNOR TO THE NATIONAL ROLLER AND BALL BEARING COMPANY, OF WASHINGTON, DISTRICT OF COLUMBIA, A CORPORATION OF VIRGINIA.

ANTIFRICTION-BEARING.

SPECIFICATION forming part of Letters Patent No. 694,608, dated March 4, 1902.

Application filed August 27, 1900. Renewed August 8, 1901. Serial No. 71,404. (No model.)

*To all whom it may concern:*

Be it known that I, WILLIAM J. BREWER, a subject of the Queen of Great Britain, residing at Washington, in the District of Columbia, have invented certain new and useful Improvements in Antifriction-Bearings for Fly-Wheels and Similar Machinery; and I do hereby declare the following to be a full, clear, and exact description of the invention, such as will enable others skilled in the art to which it appertains to make and use the same.

My invention relates to improvements in antifriction-bearings for fly-wheels and revolving surfaces generally; and it consists of the construction and arrangement of parts, which will be hereinafter fully described and claimed.

Reference is had to the accompanying drawings, in which the same parts are designated by the same letters of reference throughout the several views, and in which—

Figure 1 represents a section through the device, taken along the line 1 1 in Fig. 2, looking in the direction of the arrows and showing the antifriction-rollers in side elevation. Fig. 2 represents a section through the casing, showing the interior parts in elevation looking at the left-hand side of the device as shown in Fig. 1. Fig. 3 is a view similar to Fig. 1 and represents a slight modification of the device, the section being taken on the line 3 3 of Fig. 4 looking in the direction of the arrows. Fig. 4 is a view looking at the left-hand side of the device as shown in Fig. 3, the casing being omitted. Fig. 5 is a detail edge view of one of the rollers. Fig. 6 is a side elevation, partly in section, of the chain used in the form of bearing shown in Figs. 1 to 4. Fig. 7 is a transverse section of the same. Fig. 8 is a similar view of a slightly-modified form of chain. Fig. 9 represents a section similar to Fig. 1, the casing being omitted, of a modified form of bearing in which a ring is used in place of the chain, the shaft being shown in section. Fig. 10 is a view of the same looking at the left-hand side of the device as shown in Fig. 9. Fig. 11 is a detail view showing the roller in edge elevation, the ring in section, and a part of the shaft as used in the device as shown in Figs. 9 and 10.

A designates a shaft which may carry a fly-wheel $A'$ or any other rotating device, the said shaft extending through openings $B^0$ in the vertical supporting-plates B and being supported out of contact with the sides of the opening $B^0$ by the antifriction-rollers C, which are journaled in journal-boxes $c$, fitted in slots $b^0$ in the supporting-plates B.

The supporting-plates B are inclosed within a casing $x$, or they may be made a part of said casing, as will be obvious, and the said supporting-plates are provided with vertical slots or slideways $b^0$, which do not open through the plates, but are deep enough to form guideways for the journal-boxes $c$. (Shown in dotted lines in Fig. 1.)

The rollers C are provided with flanges $C'$, which carry the weight of the shaft A, and they are grooved, as at $c^2$, to receive a continuous body, which may be a band or sprocket chain D, which incloses and connects together the said rollers C, causing all the rollers to turn together.

The sprocket-chain D is formed of a series of blocks $d$, connected together by narrow links $d'$, of any suitable material, either elastic or substantially non-elastic. The blocks $d$ are wedge-shaped in cross-section, as shown in Fig. 7, and arranged to fit in the V-shaped grooves $c^2$ in the rollers C. These grooves $c^2$, however, are a little deeper than the blocks $d$, so that the apices of the blocks do not quite touch the bottom of the grooves.

In the form of device shown in Figs. 1 and 2 three antifriction-rollers are employed, journaled in the journal-boxes $c$, which are placed in the slots $b^0$, the lower roller C, which carries the weight of the shaft, being placed in the middle slots, which are directly beneath the shaft and extend lower than the slots at the sides of the shaft, the bottoms of the said middle slots forming supports for the journal-boxes $c$ of the said lower roller. The journal-boxes $c$ of the side rollers are held in the slots $b^0$ at the sides of the shaft A, and these side rollers prevent lateral movement of the shaft, the three rollers being held from spreading by a continuous body D, which may be either a band or chain, which incloses all three rollers, as hereinbefore described.

In Figs. 3 and 4 four rollers C are employed, and the four are held in proper relative position by retaining-rings E, in which the said rollers C are journaled, the continuous body in this instance passing around all four of the rollers to turn all of them together and at the same speed.

In the device as shown in Figs. 3 and 4 the rollers and their retaining-rings are placed within the casing X, the journals $c'$ of the rollers extending through the retaining-rings far enough to enter the guideways $b^0$ in the supporting-plates B. The guideways $b^0$ in this form of device are so placed that one of the rollers will be beneath the shaft, the two side rollers will have their centers in the same horizontal line with the shaft, and the upper roller will be above the shaft. The upper roller having very little work to do will require no other bearing than that afforded by the retaining-ring E.

In practice the casing X is filled with oil about as high as the line $x$. Thus the lower roller which carries the weight of the shaft is nearly immersed in oil, while the oil carried around by the chain will be sufficient to lubricate the other rollers. The two upper rollers C are provided with oil-ducts $c^0$, (shown in Figs. 1 and 5,) which allow the oil from the chain to pass to the journals of the rollers. A cover X' (shown in Figs. 1 and 3) is placed over the casing to prevent the oil from splashing out and also to exclude dust.

In the modification shown in Figs. 9 and 10 there are also four rollers C employed, and they are journaled in a frame F and may be supported in any suitable manner—as, for instance, in this latter form the frame F, containing the rollers, may be placed in a casing X, similar to that shown in Fig. 3, which casing, however, is not shown in Fig. 9. In this form of the device the shaft A is provided with an annular rib or collar $a$, which is V-shaped to enter the V-shaped groove $c^2$ in the rollers C to prevent endwise or longitudinal movement of the shaft, the weight of the shaft being carried by the flanges C'. In this latter form the continuous body surrounding the rollers C is shown as a ring or band H, which is V-shaped in cross-section, as shown in Fig. 11, and incloses the rollers C, turning with them and causing all of them to turn at the same speed. This band H may be a metallic ring or it may be made flexible, as may be found most advantageous in practice.

Having thus described my invention, what I claim, and desire to secure by Letters Patent of the United States, is—

1. In an antifriction-bearing the combination with a shaft, of rollers having V-shaped grooves and flanges supporting said shaft, and a continuous body inclosing said rollers; substantially as described.

2. In an antifriction-bearing the combination with a shaft; of rollers having V-shaped grooves and flanges supporting said shaft, a continuous body having V-shaped edges engaging said V-shaped grooves, said body inclosing said rollers, substantially as described.

3. In an antifriction-bearing, the combination with a shaft having a V-shaped annular rib, of rollers having V-shaped grooves receiving said V-shaped rib, and flanges supporting said shaft, and a continuous body inclosing said rollers, substantially as described.

4. In an antifriction-bearing the combination with a shaft and supporting-plates having slots; of rollers supporting said shaft and journaled in said slots, and a continuous body inclosing said rollers; substantially as described.

5. In an antifriction-bearing, the combination with a shaft, of rollers having grooves, flanges upon said rollers supporting said shaft at three points, and a continuous body inclosing said rollers and engaging said grooves, substantially as described.

6. In an antifriction-bearing the combination with a shaft, of supporting-plates having slots, rollers having flanges supporting said shaft, journals on said rollers extending into said slots, and a continuous body inclosing said rollers, substantially as described.

7. In an antifriction-bearing the combination with a shaft, of supporting-plates having slots, rollers having flanges supporting said shaft, journals on said rollers extending into said slots, a frame independent of said supporting-plates in which said rollers are journaled, and a continuous body inclosing said rollers, substantially as described.

8. In an antifriction-bearing, the combination with a shaft, of supporting-plates having slots, rollers having flanges supporting said shaft, journals on said rollers extending into said slots, a continuous body inclosing said rollers, and a casing adapted to contain oil inclosing said rollers and supporting-plates, substantially as described.

9. In an antifriction-bearing, the combination with a casing adapted to contain oil, guideways in said casing, and a shaft extending into said casing; of rollers having flanges supporting said shaft, journals on said rollers extending into said guideways, and a continuous body inclosing said rollers, substantially as described.

10. In an antifriction-bearing, the combination with a shaft having an annular rib; of rollers having grooves to receive said annular rib and flanges supporting said shaft, supporting-plates having slots therein, journals on said rollers extending into said slots, and a continuous body inclosing said rollers, substantially as described.

11. In an antifriction-bearing, the combination with a shaft having an annular rib; of rollers having grooves to receive said annular rib, and flanges supporting said shaft, supporting-plates having slots therein, journals on said rollers extending into said slots, a frame independent of said plates in which said rollers are journaled, and a continuous body inclosing said rollers; substantially as described.

12. In an antifriction-bearing, the combination with a casing adapted to contain oil, guideways in said casing, and a shaft extending into said casing and having an annular rib thereon; of rollers having grooves to receive said rib, flanges on said rollers supporting said shaft, and a continuous body engaging said grooves and inclosing said rollers; substantially as described.

13. In an antifriction-bearing, the combination with a shaft, of rollers having grooves and flanges supporting said shaft, and a V-shaped band inclosing said rollers, substantially as described.

In testimony whereof I affix my signature in presence of two witnesses.

WILLIAM J. BREWER.

Witnesses:
J. STEPHEN GIUSTA,
GUSTAVE R. THOMPSON.